April 4, 1967 J. L. McQUERRY Re. 26,186

FUEL HEATER AND SEPARATOR

Original Filed April 26, 1963

INVENTOR.
JOHN L. McQUEERY

BY Roy L. Van Winkle
ATTORNEY

United States Patent Office

Re. 26,186
Reissued Apr. 4, 1967

26,186
FUEL HEATER AND SEPARATOR

John L. McQuerry, Bethany, Okla., assignor of forty-five percent to Wiley W. Lowrey, Oklahoma City, Okla.

Original No. 3,209,816, dated Oct. 5, 1965, Ser. No. 276,008, Apr. 26, 1963. Application for reissue Dec. 6, 1965, Ser. No. 521,231
7 Claims. (Cl. 165—71)

Matter enclosed in heavy brackets [ ] appears in the original patent but forms no part of this reissue specification; matter printed in italics indicates the additions made by reissue.

This invention relates generally to an improved heater and separator for use in liquid fuel systems. More particularly, it is related to improved apparatus for heating diesel fuel and separating foreign substances, primarily water, therefrom while installed in the fuel system of diesel engines.

The efficient operation of diesel engines during extremely cold weather has been severely hampered because of the tendency of the fuel to become more viscous and because of the presence of water in the fuel, freezing of the water results in blocked fuel lines and plugged filters. As a result of the increased viscosity of the fuel, more power is required to drive the fuel pump and higher injection pressures are required. If the gelation becomes extreme, the engine may stop functioning altogether or at least miss badly.

The presence of water in the fuel not only presents problems during cold weather; it may cause the fuel injectors to be damaged to the extent that they must be replaced. The frequency of replacement depends upon the moisture content of the fuel. Many factors contribute moisture to the fuel, for example, condensation within the fuel tanks in areas of high humidity and if the main supply tanks of fuel dealers are not carefully drained, water may be pumped from them directly into the engine tanks. If sufficient water reaches the engine, it will not function.

Many attempts have been made to solve or at least minimize the foregoing problems. Naturally, much has been done toward improving the fuel and the method of handling it to reduce its gelling temperature and to eliminate insofar as possible the presence of water therein. Chemical fuel additives manufactured by many companies are available. These chemicals are added to the fuel to alleviate the gelation of the fuel during cold weather. Also, many types of apparatus for use as fuel heaters have been constructed with various degrees of success. One such heater involved the immersion of electrical heating elements in the fuel tanks. Another heater passed the exhaust manifold directly through the fuel tanks. Neither of these was particularly successful. In the Arctic, heavy insulation has been wrapped around the tanks and engines so that the engine heat was utilized to some extent. The insulation prevented the cold air from directly contacting the tanks and aided in retaining the engine heat.

Almost without exception, fuel systems are now equipped with filters. The filters are designed to remove water and other foreign matter from the fuel. During cold weather, the water thus removed, freezes in the filter. This eventually results in a complete stoppage of the fuel flow to the engine. Even in warm weather, the filter will have to be changed frequently where the moisture content of the fuel is high.

One object of this invention is to provide improved apparatus adapted to be installed in the fuel system and to provide sufficient heat to the fuel passing therethrough to prevent gelation and assure maximum engine efficiency even in extremely cold weather.

Another object of this invention is to provide improved apparatus adapted to be installed in the fuel system and to separate moisture and other foreign materials from the fuel passing therethrough.

A further object of this invention is to provide improved apparatus adapted to be installed in the fuel system that will provide sufficient heat to the fuel to prevent gelation and to separate moisture and other foreign materials from the fuel passing therethrough.

A still further object of the invention is to provide improved apparatus adapted to be installed in the fuel system that utilizes a portion of the heat from the engine exhaust gases to increase the temperature of the fuel passing therethrough.

Still another object of this invention is to provide improved apparatus adapted to be installed in the fuel system that utilizes a portion of the heat from the engine exhaust gases to increase the temperature of the fuel and utilizes a series of baffles arranged therein to separate water and other foreign material from the fuel passing therethrough.

Generally, this invention includes a hollow tube-like member connected with an exhaust deflector or scoop mounted in the exhaust pipe or manifold of the engine, a second hollow member surrounding the tube-like member and joined at each end with the tube-like member thus forming an annulus therebetween, a pair of fuel inlets and a fuel outlet mounted on the top of said second hollow member, a drain valve mounted on the bottom of said second hollow member, means connecting said inlets with a fuel supply, and means connecting said outlet with the engine.

Other, further, and additional objects and advantages of the invention will become more apparent as the following description is read in conjunction with the accompanying drawing wherein like reference characters denote like parts in all views and wherein.

Figure 1:
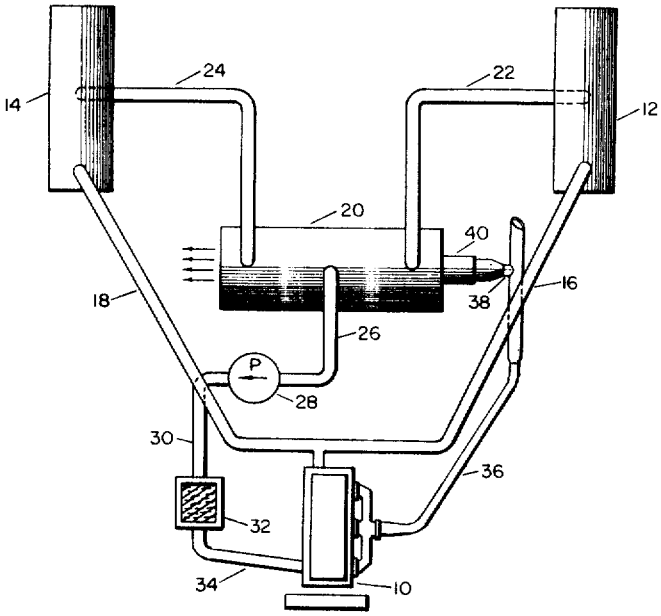
FIG. 1 is a schematic view of a diesel engine's fuel and exhaust system incorporating apparatus constructed in accordance with the invention.

Referring to the drawing, and to FIG. 1 in particular, shown therein is an engine 10 connected by return fuel lines 16 and 18 to the fuel tanks 12 and 14. The heater and separator 20 is connected with the fuel tanks 12 and 14 by the fuel supply lines 22 and 24. Also connected with the heater and separator 20 is the fuel outlet pipe 26 which is connected at its opposite end with the fuel pump 28. Pipe 30 connects the pump 28 with the fuel filter 32 and pipe 34 connects the filter 32 with the engine 10. The exhaust manifold or pipe 36 is connected at one end with the engine and is open to the atmosphere at the other.

Figure 5:
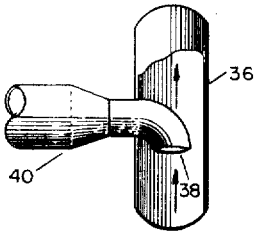
FIG. 5 is an enlarged view of the exhaust diverter or scoop mounted in the exhaust pipe or manifold of the engine.

A scoop or exhaust diverter 38 is mounted so that it extends into the exhaust pipe 36. As can be more clearly seen in FIG. 5, the scoop 38 is arranged so that only a portion of the exhaust is diverted from the pipe 36. Connected with the scoop 38 is a pipe 40 which carries the exhaust to the heater and separator 20. It should be pointed out that the pipe 40 will be of a size and length required to reach from the pipe 36 to the separator and heater 20 even though they may be somewhat remote from each other. Also, it may be flexible or include a section of flexible exhaust hose if desired or required.

Figure 4:
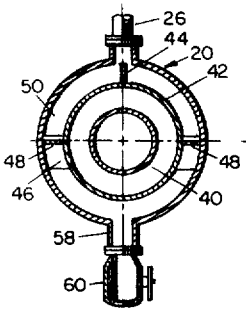
FIG. 4 is a sectional view of the heater of FIG. 2 taken along the line 4—4 of FIG. 2.
Figure 3:
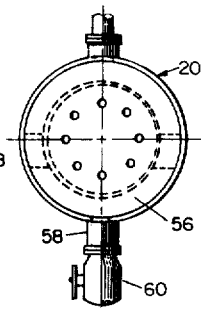
FIG. 3 is an end view of FIG. 2 taken along the line line 3—3 of FIG. 2.
Figure 2:
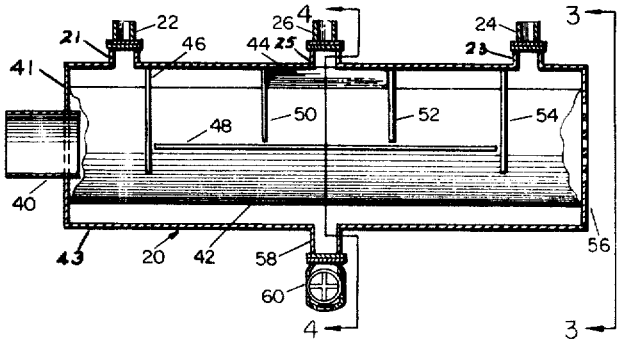
FIG. 2 is an enlarged view, partly in cross-sectional of the fuel heater and separator constructed in accordance with the invention.

FIGS. 2, 3 and 4 illustrate the construction of the heat exchanger and separator 20 in detail. It includes an end plate 41 through which the pipe 40 extends. Practically, the pipe 40 will be joined with a short nipple or threaded collar (not shown) which is welded to the end plate 41. An outer hollow member or shell 43 is joined at one end to the plate 41 and at the other end with the ported plate 56. Within the shell 43 is an inner hollow member 42. One end of the member 42 is joined to the plate 41 and the other to the ported plate 56. As shown, both the members 42 and 43 are cylindrical, but such a shape is not essential to the operation of the invention.

The arrangement of the member 42 with respect to the member 43 is such that a fluid-tight annular chamber is formed therebetween. The ends of the chamber are closed by the plates 41 and 56. As illustrated in FIG. 2, the interior of the hollow member 42 is in communication with the exhaust manifold 36 through the pipe 40. The ports are placed in the member 56 so that exhaust gases entering the interior of the hollow member 42 can escape therethrough to the atmosphere.

Fuel inlets 21 and 23 are located on the upper portion of the exchanger 20 and near either end thereof. Fuel outlet 25 is centrally located on the upper portion of the exchanger 20. The fuel inlets 21 and 23 and the fuel outlet 25 are in fluid communication with the annular chamber formed between the members 42 and 43. Fuel supply lines 22 and 24 connect with fuel inlets 21 and 23, respectively. Fuel outlet 25 is connected to the fuel outlet pipe 26.

A drain connection 58 is centrally located on the bottom portion of the exchanger 20 and is in communication with the annular chamber. Connected with the drain connection 58 is a valve 60.

A series of baffles extend between the members 42 and 43. A vertical baffle 44 is positioned vertically and extends longitudinally just below the fuel outlet 25. Circumferential baffles 46 and 54 are positioned between the fuel inlets 21 and 23, respectively. They extend partially around the circumference of the member 42, terminating just below the lower side of horizontal baffle plates 48. Two baffle plates 48 are provided with one being located on either side of the member 42 and extending longitudinally therewith. It is important to note that the baffles 48 terminate before reaching the baffles 46 and 54 so that a small gap or opening is left between the baffles.

Short circumferential baffle plates 50 and 52 are located adjacent the ends of the vertical baffle 44. They extend around the circumference of the member 42 and terminate before reaching the horizontal baffle plates 48, thus leaving a small gap therebetween.

With the engine 10 in operation, exhaust gases pass through the manifold or pipe 36 to the atmosphere. A portion of the exhaust gas is diverted by the scoop 38 mounted in the pipe 36. The gas thus diverted passes through the suitable connecting pipe 40 into the interior of the hollow member 42. Due to the restriction offered by the ported plate 56, the velocity of the gas passing through the exchanger 20 is substantially reduced, thus allowing more time for heat transfer from the hot gas to the exchanger 20 to take place.

Simultaneously, fuel is being circulated from the tanks 12 and 14, through the supply lines 22 and 24 into the exchanger and separator 20. The fuel leaves the exchanger 20 through the outlet pipe 26, passes through the fuel pump 28, and the pipe 30 to the filter 32. In the filter 32, a final attempt is made to separate moisture and other foreign matter from the fuel before it enters the engine 10. After passing through the filter 32, the fuel flows through pipe 34 to the engine 10.

Diesel systems are equipped with a series of injectors (not shown) through which the fuel must pass to enter the cylinders of the engine. The passages in the injectors are rather small and foreign matter such as water can cause serious erosion therein or otherwise foul them so that they must be replaced. Excess fuel passing by the injectors returns to the fuel tanks 12 and 14 through return fuel lines 16 and 18, respectively.

As the fuel enters the exchanger 20, it passes downwardly therein, then upwardly through the gap between circumferential baffles 46, 54 and the ends of the horizontal baffles 48. The fuel must then pass through the gap between the short circumferential baffles 50, 52 and the top of the horizontal baffles 48. From this point the fuel flows upwardly along both sides of the vertical baffle 44 into the fuel outlet 22 and thence into the outlet pipe 26.

Periodically, the water accumulation in the lower portion of the exchanger 20 is drained by opening the valve 60 which is in communication with the drain connection 58.

It is believed that the theory of the heat transfer in the exchanger 20 is readily apparent, thus requiring no further explanation. It is believed that separation of moisture and other foreign objects from the fuel occurs due to several factors. The fuel passing through the exchanger and separator 20 is subjected to very extreme directional changes, it is passed through rather small openings, and a quiet area below baffles 48 is created in which some settling can take place. These effects can be more readily appreciated realizing that as much as 90 to 100 pounds of fuel per hour will be passing through the exchanger 20.

It should be apparent that this invention discloses simple and economical apparatus that will efficiently heat the fuel and separate water and other foreign substances therefrom. It has been proven that when installed on a diesel engine-powered truck, the apparatus of this invention will enable such vehicle to operate at temperatures of minus 40 to 50 degrees Fahrenheit. It also extends the life of injectors, fuel pumps, and fuel filters.

The foregoing description is by way of illustration only and it should be apparent that many modifications and changes may be made therein without departing from the spirit of the invention or from the scope of the annexed claims.

What I claim is:

[1. A heat exchanger and separator for use in a fluid system to remove materials of higher specific gravity from the fluid passing through the heat exchanger and separator and for heating the fluid flowing therethrough, said heat exchanger and separator comprising:

a first tubular member;

a second tubular member of larger diameter and surrounding said first tubular member and having the ends thereof closed, the arrangement being such that a chamber is formed between said members;

means forming a plurality of passageways through one end of said second tubular member within the circumference of said first tubular member;

means forming a passageway through the other end of said second tubular member within the circumference of said first tubular member;

means forming an opening in the medial portion wall of said second tubular member;

valve means located in said opening, said valve means being movable between open and closed positions to permit the removal of the higher specific gravity material from said chamber when in the open position and, when in the closed position, to prevent flow through said opening;

baffle means extending between said first and second tubular member including:

a pair of longitudinal baffle members extending along said tubular members on opposite sides thereof, a first pair of circumferential baffle members terminating below and spaced apart from the ends of said pair of longitudinal baffle members, a second pair of circumferential baffle members positioned between said first pair of circumferential baffle members and having the ends thereof spaced apart from said longitudinal baffle members, and a second longitudinal baffle member extending along said tubular members and between said second pair of circumferential baffle members and disposed approximately 90° from said pair of longitudinal baffle members;

a pair of inlet means in communication with the chamber between said tubular members, each of said inlet means being located between the ends of said second tubular member and said first pair of circumferential baffle members, said inlet means being arranged to permit the entrance of fluid into said chamber; and outlet means in communication with the chamber between said tubular members, said outlet means being located over said second longitudinal baffle member and between said second pair of circumferential baffle members.]

[2. A heat exchanger and separator for use in a fluid system to remove materials of higher specific gravity from the fluid flowing through the heat exchanger and separator and for heating the fluid flowing therethrough, said heat exchanger and separator comprising:

an inner hollow member;

an outer hollow member coaxially arranged with respect to said inner hollow member;

an end plate attached to both of said members and having an opening therethrough in communication with the interior of said inner hollow member;

a ported end plate attached to both of said members and having a plurality of ports therethrough in communication with the interior of said inner hollow member, the arrangement of said end plates and hollow members being such that a chamber is formed thereby;

a pair of inlet means in communication with said chamber, each inlet being disposed relatively near one of said end plates and arranged to permit the entrance of fluid into said chamber;

outlet means in communication with said chamber disposed between said inlet means and substantially aligned therewith;

a first pair of spaced-apart baffle members extending between a portion of said inner and outer hollow members between said inlet means and on either side of said outlet means;

a pair of longitudinal baffle members extending between said inner and outer hollow members on opposed sides of said hollow members and having each of the ends of said longitudinal baffle members spaced apart from said spaced-apart baffle members;

means forming an opening extending through the wall of said outer hollow member disposed on the opposite side thereof with respect to said outlet and inlet means; and valve means operably disposed in said opening, said valve means being movable between open and closed positions to permit the removal of the higher specific gravity material from said chamber, when in the open position and, when in the closed position, to prevent flow through said opening.]

[3. The heat exchanger and separator of claim 2 and also including:

a second pair of spaced-apart baffle members extending between said hollow members, said second pair of spaced-apart baffle members being disposed between said first pair of spaced-apart baffle members and on either side of said outlet means and having the ends thereof spaced apart from said pair of longitudinal baffle members; and a second longitudinal baffle member extending between said inner and outer hollow members and said second pair of spaced-apart baffle members and disposed approximately 90° from said first pair of longitudinal baffle members and on the opposite side of said hollow members relative to said opening.]

[4. A heat exchanger and separator for use in a fluid system to remove materials of higher specific gravity from the fluid passing through the heat exchanger and separator and for heating the fluid flowing therethrough, said heat exchanger and separator comprising:

an inner hollow member through which a heating medium may flow;

an outer hollow member coaxially arranged with respect to said inner hollow member;

an end plate attached to both of said members and having an opening extending therethrough, said opening being in communication with the interior of said inner hollow member only;

an end plate attached to both of said members and having a plurality of ports extending therethrough, said ports being in communication with the interior of said inner hollow member only;

said inner and outer hollow members and said end plates being arranged to form a chamber defined by said inner and outer hollow members and said end plates;

means forming an opening extending through the medial portion of said outer hollow member into said chamber;

valve means located in said opening, said valve means being movable between open and closed positions, and, when in the open position, arranged to permit the withdrawal of the higher specific gravity material from said chamber, and, when in the closed position, to prevent flow through said opening;

baffle means extending between said inner and outer hollow members, said baffle means including:

a pair of longitudinal baffle members extending along and on opposite sides of said hollow members, a first pair of circumferential baffle members terminating below and spaced apart from the ends of said longitudinal baffle members, a second pair of circumferential baffle members positioned between said first pair of circumferential baffle members, the ends of said second pair of circumferential members being spaced apart from said longitudinal baffle members, and a second longitudinal baffle member extending between said second pair of circumferential baffle members, said second longitudinal baffle member being disposed approximately ninety (90°) degrees from said pair of longitudinal baffle members and on the opposite side of said outer hollow member relative to said opening; and, inlet means in communication with the chamber to permit the flow of fluid into said chamber; and outlet means in communication with said chamber, the arrangement of said inlet and outlet means being such that fluid entering through said inlet means must pass through said baffle means before reaching said outlet means.]

5. *A heat exchanger and separator for use in a fluid system to remove materials of higher specific gravity from the fluid passing through the heat exchanger and separator and for heating the fluid flowing therethrough, said heat exchanger and separator comprising:*

*a first elongated tubular member having two ends;*

*a second elongated, two-ended tubular member of larger diameter than said first tubular member concentrically surrounding said first tubular member and*

*having the opposite ends thereof closed, said first and second tubular members having an annular chamber formed therebetween;*

*means forming a plurality of passageways through one end of said second tubular member within the circumference of said first tubular member, said passageways communicating with the interior of said first tubular member;*

*means forming a passageway through the other end of said second tubular member within the circumference of said first tubular member, said passageway communicating with the interior of said first tubular member;*

*means forming a material discharge opening in said second tubular member in a medial portion of said second tubular member between the opposite ends thereof, said material discharge opening communicating with said annular chamber;*

*valve means located in said material discharge opening forming means, said valve means being movable between opened and closed positions to permit the removal of higher specific gravity material from said annular chamber when in the open position and, when in the closed position, to prevent flow through said material discharge opening forming means from said annular chamber;*

*baffle means positioned in said annular chamber between said concentric first and second tubular members, said baffle means including:*

*a pair of elongated baffle members in said annular chamber and extending parallel to the longitudinal axes of said concentric first and second elongated tubular members, said elongated baffle members being disposed on opposite sides of a plane passing through the common longitudinal axes of the concentric elongated first and second tubular members and through said material discharge opening, and said elongated baffle members each having a pair of opposite ends spaced from the closed ends of said second tubular member;*

*a first pair of spaced transverse baffle members in said annular chamber extending in a circumferential direction around said first tubular member for less than the entire circumference thereof, said transverse baffle members being positioned between the opposite ends of said elongated baffle members and the closed opposite ends of said second elongated tubular member, said transverse baffle members each having two opposed ends positioned on the same side of the respective elongated baffle members as said material discharge opening;*

*a second pair of spaced transverse baffle members positioned between, and spaced from, said first pair of transverse baffle members, said transverse baffle members in said second pair each extending in a circumferential direction around said first tubular member less than the entire circumference thereof, and each having a pair of opposite ends located on the opposite side of said elongated baffle members from said material discharge opening with each end of each of the transverse baffle members in said second pair being spaced from the nearest of said elongated baffle members to permit fluid flow therebetween;*

*an additional elongated baffle member extending parallel to the longitudinal axes of said elongated first and second tubular members and disposed between said second pair of transverse baffle members and approximately midway between, and substantially parallel to, said first mentioned pair of elongated baffle members on the opposite sides of said first mentioned pair of elongated baffle members from said material discharge opening;*

*a pair of spaced fluid inlet means each forming a fluid inlet opening extending through said second tubular member with said fluid inlet openings communicating with the annular chamber between said tubular members, each of said fluid inlet means being located between one of the closed ends of said second tubular member and one of said transverse baffles in said first pair of transverse baffles with the two fluid inlet means located relatively near the opposite ends of said second tubular member to permit the entrance of fluid into said annular chamber; and*

*fluid outlet means forming a fluid outlet opening extending through said second tubular member tubular member and communicating with said annular chamber, said outlet means being located adjacent said additional elongated baffle member and between said second pair of transverse baffle members.*

6. *A heat exchanger and separator for use in a fluid system to remove materials of higher specific gravity from the fluid flowing through the heat exchanger and separator, and for heating the fluids flowing therethrough, said heat exchanger and separator comprising:*

*an elongated, inner hollow member having opposed first and second ends;*

*an elongated, outer hollow member coaxially surrounding said inner hollow member and also having opposed first and second ends;*

*a first end plate attached to adjacent ends of the inner and outer hollow members to form a closure of said inner and outer hollow members, said first end plate having an opening therethrough in communication with the interior of said inner hollow member;*

*a ported second end plate attached to the adjacent second ends of said inner and outer hollow members and having a plurality of ports therethrough in communication with the interior of said inner hollow member, the arrangement of said end plates and inner and outer hollow members being such that an annular chamber is formed therebetween;*

*a pair of fluid inlet means each defining a fluid inlet opening through said outer hollow member into said annular chamber, said pair of inlet means being spaced from each other axially along said outer hollow member and positioned on the opposite end portions of said outer hollow member for admitting fluid into said annular chamber;*

*fluid outlet means defining a fluid outlet opening through said outer hollow member into said annular chamber, said fluid outlet means being disposed between, and in generally coplanar alignment with said pair of fluid inlet means;*

*a pair of spaced, longitudinal baffle members extending parallel to the coincident axes of said inner and outer hollow members in the annular chamber between said inner and outer hollow members, said longitudinal baffle members each having a pair of ends and each being positioned generally between said pair of fluid inlet means and disposed on opposite sides of a plane extending through the coincident axes of said inner and outer hollow members and through said pair of fluid inlet means and said fluid outlet means;*

*a pair of spaced, transverse baffle members in said annular chamber extending circumferentially a portion of the way around said inner hollow member and each lying in a plane extending substantially normal with respect to the coincident axes of said inner and outer hollow members, said spaced, transverse baffle members being positioned in said annular chamber between said pair of fluid inlet means and on oppo-*

*site sides of said fluid outlet means, the transverse baffle members each being axially spaced from an end of each of said longitudinal baffle members;*

*means forming a fluid discharge opening extending through said outer hollow member into communication with said annular chamber and disposed on the opposite side of said outer hollow member from said fluid outlet and fluid inlet means; and*

*valve means operably disposed in said fluid discharge opening forming means, said valve means being moveable between opened and closed positions to permit the removal of the higher specific gravity material from said annular chamber when in the open position, and, when in a closed position to prevent flow through said fluid discharge opening.*

*7. The heat exchanger and separator claimed in claim 6 and further characterized to include:*

*a second pair of spaced, transverse baffle members positioned between said first and second hollow members in said annular chamber and extending circumferentially a portion of the way around said inner hollow member, said second pair of spaced, transverse baffle members being disposed between said first mentioned pair of spaced, transverse baffle members and on the opposite sides of said fluid outlet means and each having ends spaced from said longitudinal baffle members in the direction of said outlet means; and*

*an additional longitudinal baffle member in said annular chamber extending parallel to the coincident axes of said inner and outer hollow members and between the spaced, transverse baffle members in said second pair of spaced, transverse baffle members, said additional longitudinal baffle member being disposed approximately 90° from each of said first mentioned longitudinal baffle members and on the opposite side of said outer hollow member from said fluid discharge opening.*

*8. A heat exchanger and separator for use in a fluid system to remove materials of higher specific gravity from the fluid passing through the heat exchanger and separator and for heating the fluid flowing therethrough, said heat exchanger and separator comprising:*

*an elongated, inner hollow member having opposite ends and through which a heating medium may flow;*

*an elongated, outer hollow member having opposite ends and coaxially surrounding said inner hollow member;*

*a first end plate attached to adjacent ends of said inner and outer hollow members and having an opening extending therethrough and communicating with the interior of said inner hollow member only;*

*a second end plate attached to the other two adjacent ends of said inner and outer hollow members and having a plurality of ports extending therethrough, said ports communicating with the interior of said inner hollow member only, said inner and outer hollow members and first and second end plates defining an annular chamber therebetween;*

*means forming a fluid discharge opening extending through a medial portion of said outer hollow member, with said fluid discharge opening communicating with said annular chamber;*

*valve means located in said fluid discharge opening forming means and being moveable between open and closed positions to permit selective withdrawal of fluid with relatively high specific gravity from said annular chamber through said fluid discharge opening;*

*baffle means extending between said inner and outer hollow members in said annular chamber, said baffle means including:*

*a pair of elongated, longitudinally extending, spaced baffle members extending substantially parallel to the coincident axes of said inner and outer hollow members and less than the entire length of either of said inner and outer hollow members, said longitudinally extending baffle members being spaced on opposite sides of a plane passing through the coincident axes of said inner and outer hollow members and through said fluid discharge opening;*

*a first pair of spaced, transverse baffle members in said annular chamber and extending in a circumferential direction around said inner hollow member for less than the entire circumference of said inner hollow member, each transverse baffle member in said first pair having a pair of ends with said ends of the transverse baffles each being disposed on the same side of the nearest longitudinal baffle as said fluid discharge opening, and each of said transverse baffle members being spaced axially from the adjacent ends of both of the two longitudinally extending baffles so that each of said transverse baffles is disposed between the longitudinally extending baffles and one of said end plates;*

*a second pair of spaced, transverse baffle members positioned between said first pair of said transverse baffle members in said annular chamber and extending in a circumferential direction around said inner hollow member for less than the entire circumference of said inner hollow member, each transverse baffle member in said second pair of transverse baffle members having a pair of ends spaced circumferentially from each of said longitudinally extending baffle members on the opposite side of said longitudinally extending baffle members from said fluid discharge opening and from the ends of the transverse baffle members in said first pair of transverse baffle members; and*

*an additional longitudinally extending baffle member shorter than said first mentioned elongated longitudinally extending baffle members positioned in said annular chamber and extending substantially parallel to the coincident axes of said inner and outer hollow members and extending between said second pair of transverse baffle members, said additional longitudinally extending baffle member being disposed approximately 90° from said first mentioned pair of elongated, longitudinally extending spaced baffle members and on the opposite side of said outer hollow member from said fluid discharge opening;*

*fluid inlet means forming a fluid inlet opening in said outer hollow member on the opposite side thereof from said fluid discharge opening, said fluid inlet opening communicating with said annular chamber to permit the flow of fluid into said annular chamber; and*

*fluid outlet means forming an outlet opening in said outer hollow member on the opposite side thereof from said fluid discharge opening, said fluid outlet opening being in communication with said annular chamber, the arrangement of said fluid inlet and fluid outlet means being such that fluid entering through said fluid inlet means must pass through said baffle means before reaching said fluid outlet means.*

*9. A heat exchanger and separator for use in a fluid system to remove materials of high specific gravity from the fluid flowing therethrough, said heat exchanger and separator comprising:*

*an inner, elongated hollow member having a pair of opposite ends;*

*an outer, elongated hollow member coaxially surrounding said inner hollow member and having a pair of opposite ends;*

*a first end plate attached to two adjacent ends of both*

*said hollow members and having an opening therethrough in communication with the interior of said inner hollow member;*

*a ported second end plate attached to the remaining two adjacent ends of both of said hollow members and having at least one port therethrough in communication with the interior of said inner hollow member, the arrangement of said end plates and inner and outer hollow members being such that an annular chamber is formed therebetween;*

*fluid inlet means forming a fluid inlet opening through said outer hollow member with said opening communicating with said annular chamber, said fluid inlet means being located adjacent one of said end plates for permitting fluid to enter said annular chamber through said outer hollow member;*

*fluid outlet means forming a fluid outlet opening through said outer hollow member in communication with said annular chamber, said fluid outlet means being substantially axially aligned along said elongated outer hollow member with said fluid inlet means for conveying fluid out of said annular chamber;*

*a pair of elongated baffle members extending longitudinally in said annular chamber and substantially parallel to the coincident axes of said inner and outer hollow members, said elongated baffle members each being secured at one edge to said inner hollow member with said elongated baffle members being disposed on opposite sides of the inner hollow member, on opposite sides of said fluid inlet and said fluid outlet means, and between the inner and outer hollow members;*

*a transverse baffle member positioned in a plane extending substantially normal to the coincident axes of said hollow members and positioned in said annular chamber between said hollow members and between one end of each of said elongated baffle members and said fluid inlet means, said transverse baffle member extending circumferentially a portion of the way around that portion of the annular chamber into which fluid enters and leaves by said fluid inlet and fluid inlet and fluid outlet means, and terminating on the opposite side of said pair of elongated baffle members from said fluid inlet and fluid outlet means;*

*means forming a fluid discharge opening in a medial portion of said outer hollow member and on the opposite side thereof from said fluid inlet and outlet means; and*

*valve means located in said fluid discharge opening forming means, said valve means being movable between opened and closed positions to permit the removal of higher specific gravity material from said annular chamber when in the open position and, when in a closed position, to prevent flow through said fluid discharge opening.*

10. *The heat exchanger and separator of claim* 9 *and further characterized to include an additional transverse baffle member disposed in the annular chamber between said hollow members and between said first mentioned transverse baffle member and said fluid outlet means, said additional transverse baffle member extending circumferentially a portion of the way around said annular chamber and having ends spaced from said pair of elongated baffle members to permit fluid flow therebetween.*

11. *The heat exchanger and separator of claim* 10 *and further characterized to include an additional elongated, longitudinally extending baffle member extending between said additional transverse baffle member and said fluid outlet means within said annular chamber, said additional elongated, longitudinally extending baffle member being disposed approximately 90° from each of said pair of longitudinal baffle members and aligned with said fluid outlet means.*

References Cited by the Examiner

The following references, cited by the examiner, are of record in the patented file of this patent or in the original patent.

UNITED STATES PATENTS

| | | | |
|---|---|---|---|
| 14,386 | 3/1856 | Blair | 165—161 |
| 2,070,189 | 2/1937 | Webster | 165—154 |
| 2,084,743 | 6/1937 | Rathbun | 165—161 X |
| 2,408,605 | 10/1946 | Brookes | 123—122 |
| 2,680,600 | 6/1954 | Rothemun | 165—161 |
| 2,693,942 | 11/1954 | Guala | 165—161 |
| 2,747,555 | 5/1956 | Brunner | 123—34.1 |
| 2,917,285 | 12/1959 | Schack | 165—139 |
| 2,942,855 | 6/1960 | Wellensiek | 165—159 X |

FOREIGN PATENTS

| | | |
|---|---|---|
| 200,463 | 7/1923 | Great Britain. |
| 356,178 | 1/1938 | Italy. |

ROBERT A. O'LEARY, *Primary Examiner.*

T. W. STREULE, *Assistant Examiner.*